(12) United States Patent
Ma et al.

(10) Patent No.: US 11,639,418 B2
(45) Date of Patent: May 2, 2023

(54) SYNTHESIS PROCESS FOR ONE-STEP PRODUCTION OF MONOMERIC POLYETHER FOR POLYCARBOXYLIC ACID WATER REDUCING AGENTS

(71) Applicant: JIAHUA CHEMICALS (FUSHUN) NEW MATERIAL CO. LTD., Liaoning (CN)

(72) Inventors: Caifeng Ma, Liaoning (CN); Ke Lai, Liaoning (CN); Yubo Li, Liaoning (CN)

(73) Assignee: JIAHUA CHEMICALS (FUSHUN) NEW MATERIAL CO. LTD., Fushun (CN)

( * ) Notice: Subject to any disclaimer, the term of this patent is extended or adjusted under 35 U.S.C. 154(b) by 260 days.

(21) Appl. No.: 15/734,413

(22) PCT Filed: Sep. 27, 2019

(86) PCT No.: PCT/CN2019/108647
§ 371 (c)(1),
(2) Date: Dec. 2, 2020

(87) PCT Pub. No.: WO2020/063900
PCT Pub. Date: Apr. 2, 2020

(65) Prior Publication Data
US 2021/0163680 A1 Jun. 3, 2021

(30) Foreign Application Priority Data
Sep. 27, 2018 (CN) .......................... 201811134936.8

(51) Int. Cl.
*C08G 65/26* (2006.01)
(52) U.S. Cl.
CPC ..... *C08G 65/2624* (2013.01); *C08G 65/2606* (2013.01); *C08G 65/2609* (2013.01); *C08G 65/2621* (2013.01); *C08G 2650/22* (2013.01); *C08G 2650/38* (2013.01); *C08G 2650/50* (2013.01); *C08G 2650/58* (2013.01)
(58) Field of Classification Search
CPC ............ C08G 65/2624; C08G 65/2606; C08G 65/2609; C08G 65/2621; C08G 2650/22; C08G 2650/38; C08G 2650/50; C08G 2650/58
See application file for complete search history.

(56) References Cited

U.S. PATENT DOCUMENTS

2013/0085239 A1    4/2013   Zander et al.

FOREIGN PATENT DOCUMENTS

| CN | 101928392 A | 12/2010 |
|----|-------------|---------|
| CN | 104262605 A | 1/2015 |
| CN | 105273181   | 1/2016 |
| CN | 105461914 A | 4/2016 |
| CN | 106905521   | 6/2017 |
| CN | 109384914   | 2/2019 |
| WO | 2011/095469 A1 | 8/2011 |
| WO | 2020/063900 | 4/2020 |

OTHER PUBLICATIONS

Chinese Notification of First Office Action for corresponding Chinese Appln. No. CN2018111349368 dated Mar. 2, 2020 with English translation.
Chinese Notification of Second Office Action for corresponding Chinese Appln. No. CN2018111349368 dated Aug. 18, 2020 with English translation.
Chinese Notification of Second Office Action for corresponding Chinese Appln. No. CN2018111349368 dated Dec. 8, 2020 with English translation.
International Search Report of International Application No. PCT/CN2019/108647 dated Jan. 2, 2020.
Written Opinion of International Application No. PCT/CN2019/108647 dated Dec. 26, 2019.
Shirui Xu et al., "Study on Monomer Polyether Reaction Catalyst of Poly Carboxylic Acid Water Reducing Agent", Henan Chemical Industry, vol. 33, pp. 24-26, published on 2016.
Hearing Notice of corresponding for corresponding Indian Appln. No. 202037052329 dated Dec. 31, 2021.
Indian First Office Action for corresponding Indian Appln. No. 101037052329 dated Apr. 30, 2021.
Supplementary European Search Report and Search Opinion for corresponding European Application No. 19868135 dated Jun. 22, 2021.

*Primary Examiner* — Robert S Jones, Jr.
(74) *Attorney, Agent, or Firm* — Browdy and Neimark, PLLC

(57) ABSTRACT

Provided is a synthesis process for the one-step production of a monomeric polyether for polycarboxylic acid water reducing agents, wherein the monomeric polyether is synthesized in one step by mixing an initator and a catalyst at a temperature and a pressure, and then introducing same into a reaction kettle together with an epoxide at a certain ratio for ring opening polymerization. The synthesis process of the present invention realizes continuous production without the need of first synthesizing a prepolymer and then synthesizing a macromolecular monomeric polyether step by step, thereby improving the production efficiency. By separating four links, i.e. displacement, polymerization, curing and neutralization, in conventional monomeric polyether production processes, the present invention more effectively controls each of the links and increases the utilization efficiency of the reaction kettle; in addition, the process is easy to control, the structure of the product is stable, and the retention of double-bonds is high.

18 Claims, No Drawings

SYNTHESIS PROCESS FOR ONE-STEP PRODUCTION OF MONOMERIC POLYETHER FOR POLYCARBOXYLIC ACID WATER REDUCING AGENTS

TECHNICAL FIELD

The present invention belongs to the technical field of synthesis of polyether, and specifically relates to a synthesis process for one-step production of monomeric polyether for polycarboxylic acid water reducing agents.

BACKGROUND

As an indispensable building material today, concrete has entered an era of commercialization and high performance. The commercialization and high performance of concrete benefit from concrete admixtures, among which the most important and key one is water-reducing agent. Polycarboxylic acid water-reducing agents, which are green and environmentally friendly with high performance, are the best and most promising new generation of water-reducing agents. They have strong dispersion abilities, and a small amount can show high water reducing efficiency in engineering applications, not only inducing high fluidity of concrete, but also improving the pore structure and compactness of concrete and controlling the slump loss of concrete.

Polycarboxylate water-reducing agents are low molecular comb polymers with amphiphilic properties, which are usually synthesized by copolymerization of a terminal alkenyl alkylene polyoxyethylene ether monomer with terminal double bonds and an unsaturated carboxylic acid small molecular monomer in the presence of an initiator, so monomeric polyether is an essential raw material for polycarboxylic acid water reducing agents industry.

Currently, monomeric polyether for polycarboxylic acid water reducing agents is mostly produced with traditional batch production methods. For example, Shirui, XU et al., (Shirui XU, Xin ZHAO, and Gang HAO, Study on reaction catalyst for monomeric polyether for polycarboxylic acid water-reducing agent [J]. Henan Chemical Industry, 2016, 33(10): 24-26.) disclosed an experiment for synthesizing monomeric polyether for polycarboxylic acid water reducing agents, comprising the following steps: 1) Pre-preparing a catalyst, and uniformly mixing the catalyst with methallyl alcohol in a reaction kettle; 2) Preparing an intermediate by introducing ethylene oxide to the reaction kettle; 3) continuing to add catalyst to the reaction kettle, and introducing all the remaining ethylene oxide into the reaction kettle to obtain a mixture, and subjecting the mixture to depressurizing and curing to obtain monomeric polyether. This traditional batch production method cannot achieve one-step synthesis and continuous production, because it requires to firstly synthesize a prepolymer having a lower molecular weight, and then use the prepolymer as a starting material to repeat the entire polymerization process to synthesize a monomeric polyether having a large molecular weight. Thus the traditional batch production method has a low production efficiency, accompanying with a series of problems such as unstable product quality and high residue of monomers. In light of these problems, some scholars have made improvements. For example, Chinese patent application CN105273181A discloses a continuous process for one-step production of monomeric polyether for polycarboxylic acid water reducing agents, wherein, unsaturated alcohols, unsaturated alcohol ethers or unsaturated amines are used as starting materials to carry out epoxide polymerization in multiple reaction kettles to realize continuous synthesis under conditions of a certain temperature, a certain pressure and a catalyst to obtain a product. Although this technology realizes a continuous production, it is realized by adding equipment on the basis of batch method, which increases the complexity of the process, and does not get rid of the method of firstly producing a prepolymer and then polymerizing into a macromolecular polyether monomer.

SUMMARY OF THE INVENTION

Therefore, the technical problem to be solved by the present invention is to overcome the problems that the prior art requires synthesizing a prepolymer firstly and then gradually synthesizing a macromolecular monomeric polyether, and that the prior art has low production efficiency, unstable product quality, high monomer residues, and that the prior art cannot realize continuous production.

For this purpose, the present invention provides a synthesis process for one-step production of monomeric polyether for polycarboxylic acid water reducing agents, comprising the following steps of:
1) preparing a first mixture by mixing a starting material with a catalyst in an oxygen-free environment;
2) simultaneously introducing the first mixture and an epoxide into a reaction kettle under the oxygen-free environment, during which the first mixture and the epoxide are mixed and reacted to form a second mixture; and
3) subjecting the second mixture to curing, degassing, and neutralizing to obtain a monomeric polyether product.

Preferably, the synthesis process for one-step production of monomeric polyether for polycarboxylic acid water reducing agents comprises the following steps:
1) preparing a first mixture by adding a starting material and a catalyst to a reaction kettle A, and replacing the air in the reaction kettle with high-purity $N_2$ under vacuum;
2) simultaneously introducing the first mixture and an epoxide into a reaction kettle B according to a certain rate ratio under the oxygen-free environment, during which the first mixture and the epoxide are mixed and reacted to form a second mixture; and
3) introducing the second mixture into a reaction kettle C for carrying out curing and degassing to obtain a third mixture; and introducing the third mixture and carboxylic acid into a reaction kettle D for carrying out neutralization reaction to obtain a monomeric polyether product.

Preferably, the starting material is selected from the group consisting of unsaturated alcohols, unsaturated alcohol ethers and unsaturated amines.

More preferably, the starting material is preferably selected from the group consisting of allyl alcohol, methallyl alcohol, isopentenyl alcohol, crotonyl alcohol, heptenal, allyl alcohol glycol ether, methallyl alcohol glycol ether, 4-hydroxybutyl vinyl ether, 4-hydroxybutyl methallyl alcohol, allylamine, diallylamine, methallylamine, ethyl allylamine and homologues thereof, including isomers of homologues thereof.

Preferably, the epoxide is one or more selected from the group consisting of ethylene oxide, propylene oxide and butylene oxide.

Preferably, the catalyst is one or more selected from the group of an alkali metal, an alkali metal hydroxide, an alkali metal hydride, an alkaline earth metal hydroxide, an alkoxy alkali metal, an alkaline earth metal oxide and an organic alkali catalyst.

More preferably, the catalyst is preferably as follows: the alkali metal is sodium or potassium; the alkali metal hydroxide is potassium hydroxide, sodium hydroxide or lithium hydroxide; the alkali metal hydride is sodium hydride or potassium hydride; the alkaline earth metal hydroxide is magnesium hydroxide or calcium hydroxide; the alkoxy alkali metal is sodium methoxide, sodium ethoxide, potassium methoxide or potassium glycerolate; the alkaline earth metal oxide is magnesium oxide or calcium oxide; and the organic alkali catalyst is ethanolamine, diethanolamine, triethanolamine, dimethylamine, trimethylamine, diethylamine or triethylamine.

Preferably, in the step 1), the first mixture is heated to a temperature of 70° C. to 100° C., and preferably to a temperature of 80° C.

Preferably, in the step 1), the air in the reaction kettle is replaced with high-purity $N_2$ under vacuum, and $N_2$ is continuously introduced to reach a pressure of 0.2 MPa to 0.5 MPa, preferably 0.3 MPa, in the reaction kettle.

Preferably, in the step 2), the first mixture and the epoxide are reacted at a temperature of 100° C. to 125° C. and a pressure of 0 MPa<P≤0.4 MPa.

Preferably, in the step 2), the first mixture is introduced into the reaction kettle at a rate of 30 kg/h to150 kg/h.

Preferably, in the step 3), the curing and degassing are both carried out at a temperature of 100° C. to 125° C., and the neutralizing is carried out at a temperature of 70° C. to 100° C.

Preferably, in the step 3), the neutralizing is carried out with glacial acetic acid.

Preferably, a molar ratio of the starting material to the epoxide is 1:(21 to 112); preferably 1:(50 to 71). The molar ratio of the starting material to the epoxide in the reaction system will affect the polymerization rate of the entire system, and affect the molecular weight, purity and performance of the product.

Preferably, the catalyst accounts for 0.02% to 0.08%, preferably 0.04% of a total amount of feeding materials.

As an important component of high-performance concrete, polycarboxylic acid water reducing agents have received increasing attentions. Therefore, how to design a synthesis process that can continuously produce products with high performance, stable quality and low operational difficulty has important practical significance for the development of the building materials industry. In the present invention, the first mixture and the epoxide are mixed during the process of introducing them into the reaction kettle, such that the reaction is completed instantaneously, and one-step production of the target product is completed by controlling the ratio and rate of the introduced reactants. The four steps including replacement, polymerization, curing and neutralization comprised in a conventional production processes for monomeric polyether are thus separated, which is helpful to control each of the steps and can increase the utilization efficiency of the reaction kettle. By limiting the temperature of the reaction kettle A can allow better mixing of the starting material and the catalyst and can preheat them to promote the reaction. The pressure of reaction kettle A is set as positive pressure, which can ensure the tightness of the reaction kettle on the one hand, and can realize the transfer of materials from the reaction kettle A to the reaction kettle B through pressure and control the transfer rate on the other hand. The reaction temperature directly affects ring opening polymerization rate of the epoxide, and also has a great impact on the product quality. The temperature of the reaction kettle B is controlled to 100° C. to 125° C. and the pressure is controlled to 0 MPa<P≤0.4 MPa, which can make the reaction stable and controllable, and can realize continuous production in a real sense. In addition, the amount of catalyst plays a vital role in the reaction process. Excessive amount of catalyst will cause the reaction too fast, generating exothermic heat, and continuous cooling is required to control the reaction temperature, and it will also lead to an increase in by-products. Too little amount of catalyst will reduce the reaction rate, result in incompletely reaction, and increase the process time and cost. The amount of catalyst in the present invention is far less than the amount of catalyst in the prior art, which is determined by the process itself. Introducing the starting material and the epoxide simultaneously at a certain ratio to realize one-step synthesis can greatly improve the utilization rate and catalytic efficiency of the catalyst.

Compared with the prior art, the present invention has the following advantages:

1. The present invention provides a synthesis process for one-step production of monomeric polyether for polycarboxylic acid water reducing agents. Firstly, a first mixture is prepared by mixing a starting material with a catalyst in an oxygen-free environment, and then the first mixture and an epoxide are simultaneously introduced into a reaction kettle under the oxygen-free environment. The most important thing is that the first mixture and the epoxide are mixed during the introducing process. The first mixture and the epoxide can be introduced in a co-current manner, so that the first mixture and the epoxide are mixed and reacted in the co-current feeding process. The present invention realizes one-step synthesis of monomeric polyether by simultaneously introducing mixture of the starting material and the catalyst and the epoxide at a certain ratio into the reaction kettle, such that the raw materials react during the mixing process, thus realizing the one-step synthesis of monomeric polyether. There is no need to first synthesize a prepolymer and then synthesize a macromolecular monomeric polyether step by step, so the production efficiency is improved in the present invention. In addition, the process is simple, and the prepared product has stable structure and high retention rate of double bond.

2. The synthesis process for one-step production of monomeric polyether for polycarboxylic acid water reducing agents can realize continuous production. Simultaneously introducing the mixture and epoxide at a certain ratio into the reaction kettle A can make them react simultaneously, which can also realize the purpose of continuous reaction. In the prior art, a certain amount of starting material is introduced firstly, and then part of the epoxide is introduced to produce an intermediate, and then epoxide is continued to introduce for reaction, so the product cannot be directly synthesized. However, in the present invention, the starting material and the epoxide are introduced simultaneously, thus the reaction is instantaneously, and the required molecular weight can be directly obtained without an intermediate. The product is produced continuously and the performance indicators are more stable.

3. The synthesis process for one-step production of monomeric polyether for polycarboxylic acid water reducing agents can realize preparing of a monomeric polyether with a controllable molecular weight. The process is mainly conducted by simultaneously introducing the starting material and the epoxide into the reaction kettle B, and controlling molecular weight by adjusting the feeding rate of the starting material and the epoxide. Further, the polyether of the corresponding molecular weight is directly synthesized in the only reaction kettle B, and there is no need to use multiple reaction kettles.

4. The synthesis process for one-step production of monomeric polyether for polycarboxylic acid water reducing agents can realize controllable adjustment of each step in the reaction. By separating four sections, i.e. replacement, polymerization, curing and neutralization comprised in conventional monomeric polyether production processes into four reaction kettles A, B, C, D respectively, reaction kettles for different steps are provided separately, which can not only more effectively control each of the sections, but can also increase the utilization efficiency of the reaction kettle, thus few devices are idle. Moreover, the number of reaction kettles equipped with each reaction kettle can be different according to the different cycle conditions in each reaction kettle, so as to achieve the purpose of achieving the maximum production capacity with the least number of reaction kettles.

DETAILED DESCRIPTION OF THE EMBODIMENTS

The following embodiments are provided for better understanding of the present invention, which are not limited to the best embodiment, and do not means to limit the content and protection scope of the present invention. Any product identical or similar to the present application obtained by combining the features of other prior art and those of the present application shall fall within the protection scope of the present application.

If specific experimental steps or conditions are not specified in the embodiments, it can be carried out according to the conventional experimental steps described in the prior art. The reagents or instruments used without indicating the manufacturers are all conventional reagent products that are commercially available.

Embodiment 1
Preparation of Methallyl Alcohol Polyoxyethylene Ether (1) Preparing a first mixture by adding 1350 kg of methallyl alcohol and 20 kg of sodium metal to a reaction kettle A, replacing the air in reaction kettle A with high-purity $N_2$, continuing to introducing $N_2$ until the pressure of the reaction kettle A is 0.3 MPa, and heating the reaction kettle A to a temperature of 80° C.

(2) Simultaneously introducing the first mixture and ethylene oxide into a reaction kettle B under the oxygen-free environment, during which the first mixture and the ethylene oxide are mixed, wherein the first mixture is introduced at a rate of 50 kg/h, and the first mixture and ethylene oxide are introduced at a rate molar ratio of 1:53, and a total amount of 43650 kg of ethylene oxide is introduced, then adjusting the temperature of the reaction kettle B to 100° C. to 120° C., and the pressure of the reaction kettle B to 0<P≤MPa, and reacting to obtain a second mixture.

(3) Introducing the second mixture into a reaction kettle C where the second mixture is subjected to curing under a reduced pressure at a temperature of 110° C. to 120° C. for 1 h to obtain a cured mixture, degassing the cured mixture under vacuum for 30 min to obtain a third mixture. Introducing the third mixture into a reaction kettle D, cooling the reaction kettle D to a temperature below 100° C., introducing 55 kg of glacial acetic acid into the reaction kettle D to carry out neutralization reaction for a reaction time of 30 min, and cooling the reaction kettle D to a temperature of 80° C. when an aqueous solution comprising 1% methallyl alcohol polyoxyethylene ether has a pH value of less than 7.00, thus obtaining a methallyl alcohol polyoxyethylene ether.

Wherein, the rate molar ratio of the first mixture to ethylene oxide refers to the rate molar ratio of the starting material in the first mixture to ethylene oxide, That is, the amount of the catalyst is omitted because its amount is very small in industrial production.

A sliced sample is tested and the results are as follows: the product is a white or milky white flaky solid and has a chromaticity of ≤50 #Pt—Co when the product is melted, and the product has a water content of ≤0.15%, a hydroxyl value of 22.4 mgKOH/g to 24.4 mgKOH/g, a PH value of 6.0 to 7.0, and a double bond retention rate of ≥96.5%.

Embodiment 2
Preparation of Isopentenol Polyoxyethylene Ether (1) Preparing a first mixture by adding 1600 kg of isopentenol and 20 kg of sodium metal to a reaction kettle A, replacing the air in the reaction kettle A with high-purity $N_2$, continuing to introducing $N_2$ until the pressure of the reaction kettle A is 0.3 MPa, and heating the reaction kettle A to a temperature of 80° C.

(2) Simultaneously introducing the first mixture and ethylene oxide into a reaction kettle B under the oxygen-free environment, during which the first mixture and the ethylene oxide are mixed, wherein the first mixture is introduced at a rate of 80 kg/h, and the first mixture and ethylene oxide are introduced at a rate molar ratio of 1:52.5, and a total amount of 43000 kg of ethylene oxide is introduced, then adjusting the temperature of the reaction kettle B to 105° C. to 110° C., and the pressure of the reaction kettle B to 0<P≤0.4 MPa, and reacting to obtain a second mixture.

(3) Introducing the second mixture into a reaction kettle C where the second mixture is subjected to curing under a reduced pressure at a temperature of 105° C. to 110° C. for 1 h to obtain a cured mixture, degassing the cured mixture under vacuum for 30 min to obtain a third mixture. Introducing the third mixture into a reaction kettle D, cooling the reaction kettle D to a temperature below 100° C., and introducing 55 kg of glacial acetic acid into the reaction kettle D to carry out neutralization reaction for a reaction time of 30 min, and cooling the reaction kettle D to a temperature of 80° C. when an aqueous solution comprising 1% isopentenol polyoxyethylene ether has a pH value of less than 7.00, thus obtaining an isopentenol polyoxyethylene ether.

Wherein, the rate molar ratio of the first mixture to ethylene oxide refers to the rate molar ratio of the starting material in the first mixture to ethylene oxide, That is, the amount of the catalyst is omitted because its amount is very small in industrial production.

A sliced sample is tested and the results are as follows: the product is a white or milky white flaky solid and has a chromaticity of ≤50 #Pt—Co when the product is melted, and the product has a hydroxyl value of 22.4 mgKOH/g to 24.4 mgKOH/g, a water content of ≤0.15%, a PH value of 5.5 to 7, and a double bond retention rate of ≥96.5%.

Embodiment 3
Preparation of Isopentenol Polyoxyethylene Ether (1) Preparing a first mixture by adding 3870 kg of isopentenol and 20 kg of sodium metal to a reaction kettle A, replacing the air in reaction kettle A with high-purity $N_2$, continuing to introducing $N_2$ until the pressure of the reaction kettle A is 0.3 MPa, and heating the reaction kettle A to a temperature of 80° C.

(2) Simultaneously introducing the first mixture and ethylene oxide into a reaction kettle B, under the oxygen-free environment, during which the first mixture and the ethylene oxide are mixed, wherein the first mixture is introduced at a rate of 150 kg/h, and the first mixture and ethylene oxide are introduced at a rate molar ratio of 1:21, and a total amount of 41130 kg of ethylene oxide is introduced, then adjusting the temperature of the reaction kettle B to 105° C. to 110° C., and the pressure of the reaction kettle B to 0<P≤0.4 MPa, and reacting to obtain a second mixture.

(3) Introducing the second mixture into a reaction kettle C where the second mixture is subjected to curing under a reduced pressure at a temperature of 105° C. to 110° C. for 1 h to obtain a cured mixture, degassing the cured mixture under vacuum for 30 min to obtain a third mixture. Introducing the third mixture into a reaction kettle D, cooling the reaction kettle D to a temperature below 100° C., and introducing 55 kg of glacial acetic acid into the reaction kettle D to carry out neutralization reaction for a reaction time of 30 min, and cooling the reaction kettle D to a temperature of 80° C. when an aqueous solution comprising 1% isopentenol polyoxyethylene ether has a pH value of less than 7.00, thus obtaining an isopentenol polyoxyethylene ether.

Wherein, the rate molar ratio of the first mixture to ethylene oxide refers to the rate molar ratio of the starting material in the first mixture to ethylene oxide, That is, the amount of the catalyst is omitted because its amount is very small in industrial production.

A sliced sample is tested and the results are as follows: the product is a white solid and has a chromaticity of ≤50 #Pt—Co when the product is melted, and the product has a hydroxyl value of 55.7 mgKOH/g to 57.7 mgKOH/g, a PH value of 5.0 to 7, and a double bond retention rate of ≥96.5%.

Embodiment 4
Preparation of Methallyl Alcohol Polyoxyethylene Ether (1) Preparing a first mixture by adding 1080 kg of methallyl alcohol and 20 kg of sodium metal to a reaction kettle A, replacing the air in the reaction kettle A with high-purity N2, continuing to introducing $N_2$ until the pressure of the reaction kettle A is 0.3 MPa, and heating the reaction kettle A to a temperature of 80° C.

(2) Simultaneously introducing the first mixture and ethylene oxide into a reaction kettle B under the oxygen-free environment, during which the first mixture and the ethylene oxide are mixed, wherein the first mixture is introduced at a rate of 30 kg/h, and the first mixture and ethylene oxide are introduced at a rate molar ratio of 1:66, and a total amount of 43920 kg of ethylene oxide is introduced, then adjusting the temperature of the reaction kettle B to a 100° C. to 120° C., and the pressure of the reaction kettle B to 0<P≤0.35 MPa, and reacting to obtain a second mixture.

(3) Introducing the second mixture into a reaction kettle C where the second mixture is subjected to curing under a reduced pressure at a temperature of 110° C. to 120° C. for 1 h to obtain a cured mixture, degassing the cured mixture under vacuum for 30 min to obtain a third mixture. Introducing the third mixture into a reaction kettle D, cooling the reaction kettle D to a temperature of below 100° C., and introducing 55 kg of glacial acetic acid into the reaction kettle D to carry out neutralization reaction for a reaction time of 30 min, and cooling the reaction kettle D to a temperature of 80° C. when an aqueous solution comprising 1% methallyl alcohol polyoxyethylene ether has a pH value of less than 7.00, thus obtaining a methallyl alcohol polyoxyethylene ether.

Wherein, the rate molar ratio of the first mixture to ethylene oxide refers to the rate molar ratio of the starting material in the first mixture to ethylene oxide, That is, the amount of the catalyst is omitted because its amount is very small in industrial production.

A sliced sample is tested and the results are as follows: the product is a white or milky white flaky solid and has a chromaticity of ≤50 #Pt—Co when the product is melted, and the product has a hydroxyl value of 17.5 mgKOH/g to 18.7 mgKOH/g, a water content of ≤0.15%, and a PH value of 6.0 to 7.0.

Embodiment 5
Preparation of Methallyl Alcohol Polyoxyethylene Ether (1) Preparing a first mixture by adding 1350 kg of methallyl alcohol and 35 kg of sodium hydride to a reaction kettle A, replacing air in the reaction kettle A with high-purity $N_2$, continuing to introducing $N_2$ until the pressure of the reaction kettle A is 0.3 MPa, and heating the reaction kettle A to a temperature of 80° C.

(2) Simultaneously introducing the first mixture and ethylene oxide into a reaction kettle B under the oxygen-free environment, during which the first mixture and the ethylene oxide are mixed, wherein the first mixture is introduced at a rate of 60 kg/h, and the first mixture and ethylene oxide are introduced at a rate molar ratio of 1:53, and a total amount of 43650 kg of ethylene oxide is introduced, then adjusting the temperature of the reaction kettle B to 100° C. to 120° C., and the pressure of the reaction kettle B to 0<P≤0.4 MPa, and reacting to obtain a second mixture.

(3) Introducing the second mixture into reaction kettle C where the second mixture is subjected to curing under a reduced pressure at a temperature of 110° C. to 120° C. for 1 h to obtain a cured mixture, degassing the cured mixture under vacuum for 30 min to obtain a third mixture. Introducing the third mixture into a reaction kettle D, cooling the reaction kettle D to a temperature below 100° C., and introducing 92 kg of glacial acetic acid into the reaction kettle D to carry out neutralization reaction for a reaction time of 30 min, cooling the reaction kettle D to a temperature of 80° C. when an aqueous solution comprising 1% methallyl alcohol polyoxyethylene ether has a pH value of less than 7.00, thus obtaining a methallyl alcohol polyoxyethylene ether.

Wherein, the rate molar ratio of the first mixture to ethylene oxide refers to the rate molar ratio of the starting material in the first mixture to ethylene oxide, That is, the amount of the catalyst is omitted because its amount is very small in industrial production.

A sliced sample is tested and the results are as follows: the product is a white or milky white flaky solid and has a chromaticity of ≤50 #Pt—Co when the product is melted, and the product has a water content of ≤0.15%, a hydroxyl value of 22.4 mgKOH/g to 24.4 mgKOH/g, a PH value of 6.0 to 7.0, and a double bond retention rate of ≥96.5%.

Embodiment 6
Preparation of Allylamine Polyoxyethylene Ether (1) Preparing a first mixture by adding 1070 kg of allylamine and 18 kg of sodium metal to a reaction kettle A, replacing air in the reaction kettle A with high-purity $N_2$, continuing to introducing $N_2$ until the pressure of the reaction kettle A is 0.3 MPa, and heating the reaction kettle A to a temperature of 80° C.

(2) Simultaneously introducing the first mixture and ethylene oxide into a reaction kettle B under the oxygen-free environment, during which the first mixture and the ethylene oxide are mixed, wherein the first mixture is introduced at a rate of 30 kg/h, and the first mixture and ethylene oxide are introduced at a rate molar ratio of 1:53, and a total amount of 43650 kg of ethylene oxide is introduced, then adjusting the temperature of the reaction kettle B to 100° C. to 120° C., and the pressure of the reaction kettle B to 0<P≤0.4 MPa, and reacting to obtain a second mixture.

(3) Introducing the second mixture into a reaction kettle C where the second mixture is subjected curing under a reduced pressure at a temperature of 110° C. to 120° C. for 1 h to obtain a cured mixture, degassing the cured mixture under vacuum for 30 min to obtain a third mixture. Introducing the third mixture into a reaction kettle D, cooling the reaction kettle D to a temperature below 100° C., and introducing 48 kg of glacial acetic acid into the reaction kettle D to carry out neutralization reaction for a reaction time of 30 min, and cooling the reaction kettle D to a temperature of 80° C. when an aqueous solution comprising 1% allylamine polyoxyethylene ether has a pH value of less than 7.00, thus obtaining an allylamine polyoxyethylene ether.

Wherein, the rate molar ratio of the first mixture to ethylene oxide refers to the rate molar ratio of the starting material in the first mixture to ethylene oxide, That is, the amount of the catalyst is omitted because its amount is very small in industrial production.

A sliced sample is tested and the results are as follows: the product is a white or milky white flaky solid and has a chromaticity of ≤50 #Pt—Co when the product is melted, and the product has a water content of ≤0.15%, a hydroxyl value of 22.4 mgKOH/g to 24.4 mgKOH/g, a PH value of 6.0 to 7.0, and a double bond retention rate of ≥96.5%.

Embodiment 7
Preparation of Isopentenol Polyoxyethylene Polyoxypropylene Ether (1) Preparing a first mixture by adding 3870 kg of isopentenol and 20 kg of sodium metal to a reaction kettle A, replacing air in the reaction kettle A with high-purity $N_2$, continuing to introducing $N_2$ until the pressure of the reaction kettle A is 0.3 MPa, and heating the reaction kettle A to a temperature of 80° C.

(2) Simultaneously introducing the first mixture and an epoxide (comprising ethylene oxide and propylene oxide at a molar ratio of 2.86:1) into a reaction kettle B under the oxygen-free environment, during which the first mixture and the epoxide are mixed, wherein the first mixture is introduced at a rate of 100 kg/h, and the first mixture and epoxide are introduced at a rate molar ratio of 1:19, and a total amount of 41130 kg of epoxide is introduced, then adjusting the temperature of the reaction kettle B to 105° C. to 110° C., and the pressure of the reaction kettle B to 0<P≤0.4 MPa, and reacting to obtain a second mixture.

(3) Introducing the second mixture into a reaction kettle C where the second mixture is subjected to curing under a reduced pressure at a temperature of 105° C. to 110° C. for 1 h to obtain a cured mixture, degassing the cured mixture under vacuum for 30 min to obtain a third mixture. Introducing the third mixture into a reaction kettle D, cooling reaction kettle D to a temperature below 100° C., and introducing 92 kg of glacial acetic acid into the reaction kettle D to carry out neutralization reaction for a reaction time of 30 min, cooling the reaction kettle D to a temperature of 80° C. when an aqueous solution comprising 1% isopentenol polyoxyethylene polyoxypropylene ether has a pH value of less than 7.00, thus obtaining an isopentenol polyoxyethylene polyoxypropylene ether.

Wherein, the rate molar ratio of the first mixture to epoxide refers to the rate molar ratio of the starting material in the first mixture to epoxide, That is, the amount of the catalyst is omitted because its amount is very small in industrial production.

A sliced sample is tested and the results are as follows: the product is a colorless to light yellow transparent liquid, and has a chromaticity of ≤50 #Pt—Co, a hydroxyl value of 21 mgKOH/g to 25 mgKOH/g, an unsaturation degree of ≥0.37 mgKOH/g, a double bond retention rate of ≥90%, and a PH value (for an aqueous solution comprising 1% isopentenol polyoxyethylene polyoxypropylene ether) of 5 to 7.

Embodiment 8
Preparation of Methallylamine Polyoxybutene Ether (1) Preparing a first mixture by adding 1350 g of methallylamine, 5 g of sodium hydroxide and 5 g of magnesium hydroxide to a reaction kettle A, replacing air in the reaction kettle A with high-purity $N_2$, continuing introducing $N_2$ until the pressure of the reaction kettle A is 0.2 MPa, and heating the reaction kettle A to a temperature of 70° C.

(2) Simultaneously introducing the first mixture and butylene oxide into a reaction kettle B under the oxygen-free environment, during which the first mixture and the butylene oxide are mixed, and keeping a molar ratio of methallylamine to butylene oxide being 1:31.5, wherein the first mixture is introduced at a rate of 30 kg/h, and the first mixture and butylene oxide are introduced at a rate molar ratio of 1:31.5, then adjusting the temperature of the reaction kettle B to 100° C., and the pressure of the reaction kettle B to 0.2 MPa, and reacting to obtain a second mixture.

(3) Introducing the second mixture into a reaction kettle C where the second mixture is subjected curing under a reduced pressure at a temperature of 120° C. for 1 h to obtain a cured mixture, degassing the cured mixture under vacuum for 30 min to obtain a third mixture. Introducing the third mixture into a reaction kettle D, cooling reaction kettle D to a temperature of 90° C., and introducing 30 kg of glacial acetic acid into the reaction kettle D to carry out neutralization reaction for a reaction time of 30 min, and cooling the reaction kettle D to a temperature of 70° C. when an aqueous solution comprising 1% methallylamine polyoxybutene ether has a pH value of less than 7.00, thus obtaining a methallylamine polyoxybutene ether.

Wherein, the rate molar ratio of the first mixture to butylene oxide refers to the rate molar ratio of the starting material in the first mixture to butylene oxide, That is, the amount of the catalyst is omitted because its amount is very small in industrial production.

A sliced sample is tested and the results are as follows: the product is a white or milky white flaky solid and has a chromaticity of ≤40 #Pt—Co when the product is melted, and the product has a water content of ≤0.08%, a hydroxyl value of 24.2 mgKOH/g, a PH value of 6.5, and a double bond retention rate of ≥97.5%.

Embodiment 9
Preparation of Allyl Alcohol Glycol Ether Polyoxyethylene Ether (1) Preparing a first mixture by adding 408 g of allyl alcohol glycol ether, 10 g of diethanolamine and 20 g of potassium metal to a reaction kettle A, replacing air in the reaction kettle A with high-purity $N_2$, continuing to introducing $N_2$ until the pressure of the reaction kettle A is 0.4 MPa, and heating the reaction kettle A to a temperature of 90° C.

(2) Simultaneously introducing the first mixture and ethylene oxide into a reaction kettle B under the oxygen-free environment, during which the first mixture and the ethylene oxide are mixed, wherein the first mixture is introduced at a rate of 30 kg/h, and the first mixture and ethylene oxide are introduced at a rate molar ratio of 1:53, and a total amount of 9328 g of ethylene oxide is introduced, then adjusting the temperature of the reaction kettle B to 110° C., and the pressure of the reaction kettle B to 0.1 MPa, and reacting to obtain a second mixture.

(3) Introducing the second mixture into a reaction kettle C where the second mixture is subjected to curing under a reduced pressure at a temperature of 115° C. for 1 h to obtain a cured mixture, degassing the cured mixture under vacuum for 30 min to obtain a third mixture. Introducing the third mixture into a reaction kettle D, cooling the temperature to 90° C., and introducing 40 kg of glacial acetic acid into the reaction kettle D to carry out neutralization reaction for a reaction time of 30 min, and cooling the reaction kettle D to a temperature of 70° C. when an aqueous solution comprising 1% allyl alcohol glycol ether polyoxyethylene ether has a pH value of less than 7.00, thus obtaining an allyl alcohol glycol ether polyoxyethylene ether.

Wherein, the rate molar ratio of the first mixture to ethylene oxide refers to the rate molar ratio of the starting material in the first mixture to ethylene oxide, That is, the amount of the catalyst is omitted because its amount is very small in industrial production.

A sliced sample is tested and the results are as follows: the product is a white or milky white flaky solid and has a chromaticity of ≤30 #Pt—Co when the product is melted, and the product has a water content of ≤0.10%, a hydroxyl value of 23.02 mgKOH/g, a PH value of 6.8, and a double bond retention rate of ≥98.0%.

Embodiment 10
Preparation of Methallyl Alcohol Polyoxyethylene Ether (1) Preparing a first mixture by adding 1350 kg of methallyl alcohol and 20 kg of sodium metal to a reaction kettle A, replacing air in the reaction kettle A with high-purity $N_2$, continuing to introducing $N_2$ until the pressure of the reaction kettle A is 0.5 MPa, and heating the reaction kettle A to a temperature of 100° C.

(2) Simultaneously introducing the first mixture and ethylene oxide into a reaction kettle B under the oxygen-free environment, during which the first mixture and the ethylene oxide are mixed, wherein the first mixture is introduced at a rate of 30 kg/h, and the ethylene oxide is introduced at a rate of 970 kg/h, and a total amount of 43650 g of ethylene oxide is introduced, then adjusting the temperature of the reaction kettle B to 120° C., and the pressure of the reaction kettle B to 0.4 MPa, and reacting to obtain a second mixture.

(3) Introducing the second mixture into a reaction kettle C where the second mixture is subjected to curing under a reduced pressure at a temperature of 110° C. for 1 h to obtain a cured mixture, degassing the cured mixture under vacuum for 30 min to obtain a third mixture. Introducing the third mixture into a reaction kettle D, cooling the reaction kettle D to a temperature of 80° C., and introducing 55 kg of glacial acetic acid into the reaction kettle D to carry out neutralization reaction for a reaction time of 30 min, and cooling the reaction kettle D to a temperature of 70° C. when an aqueous solution comprising 1% methallyl alcohol polyoxyethylene ether has a pH value of less than 7.00, thus obtaining a methallyl alcohol polyoxyethylene ether.

Wherein, the rate molar ratio of the first mixture to ethylene oxide refers to the rate molar ratio of the starting material in the first mixture to ethylene oxide, That is, the amount of the catalyst is omitted because its amount is very small in industrial production.

A sliced sample is tested and the results are as follows: the product is a white or milky white flaky solid and has a chromaticity of ≤40 #Pt—Co when the product is melted, and the product has a water content of ≤0.13%, a hydroxyl value of 23.4 mgKOH/g, a PH value of 6.3, and a double bond retention rate of ≥98.0%.

Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:

1. A synthesis process for one-step production of monomeric polyether for polycarboxylic acid water reducing agents, comprising the following steps of:
    1) preparing a first mixture by mixing a starting material with a catalyst in an oxygen-free environment;
    2) simultaneously introducing the first mixture and an epoxide into a reaction kettle under the oxygen-free environment, during which the first mixture and the epoxide are mixed and reacted to form a second mixture, wherein the first mixture is introduced into the reaction kettle at a rate of 30 kg/h to 150 kg/h; and
    3) subjecting the second mixture to curing, degassing, and neutralizing to obtain a monomeric polyether product.

2. The synthesis process of claim 1, wherein, the starting material is selected from the group consisting of unsaturated alcohols, unsaturated alcohol ethers and unsaturated amines.

3. The synthesis process of claim 1, wherein, the epoxide is one or more selected from the group consisting of ethylene oxide, propylene oxide and butylene oxide.

4. The synthesis process of claim 1, wherein, the catalyst is one or more selected from the group of an alkali metal, an alkali metal hydroxide, an alkali metal hydride, an alkaline earth metal hydroxide, an alkoxy alkali metal, an alkaline earth metal oxide and an organic alkali catalyst.

5. The synthesis process of claim 1, wherein, in the step 1), the first mixture is heated to a temperature of 70° C. to 100° C.

6. The synthesis process of claim 1, wherein, in the step 2), the first mixture and the epoxide are reacted at a temperature of 100° C. to 125° C. and a pressure of 0 MPa<P≤0.4 MPa.

7. The synthesis process of claim 1, wherein, in the step 3), the curing and degassing are both carried out at a temperature of 100° C. to 125° C., and the neutralizing is carried out at a temperature of 70° C. to 100° C.

8. The synthesis process of claim 1, wherein a molar ratio of the starting material to the epoxide is 1:(21 to 112).

9. The synthesis process of claim 1, wherein the catalyst accounts for 0.02% to 0.08% of a total amount of feeding materials.

10. The synthesis process of claim 2, wherein the epoxide is one or more selected from the group consisting of ethylene oxide, propylene oxide and butylene oxide.

11. The synthesis process of claim 2, wherein the catalyst is one or more selected from the group of an alkali metal, an alkali metal hydroxide, an alkali metal hydride, an alkaline earth metal hydroxide, an alkoxy alkali metal, an alkaline earth metal oxide and an organic alkali catalyst.

12. The synthesis process of claim 3, wherein the catalyst is one or more selected from the group of an alkali metal, an alkali metal hydroxide, an alkali metal hydride, an alkaline earth metal hydroxide, an alkoxy alkali metal, an alkaline earth metal oxide and an organic alkali catalyst.

13. The synthesis process of claim 2, wherein, in the step 1), the first mixture is heated to a temperature of 70° C. to 100° C.

14. The synthesis process of claim 3, wherein, in the step 1), the first mixture is heated to a temperature of 70° C. to 100° C.

15. The synthesis process of claim 2, wherein, in the step 2), the first mixture and the epoxide are reacted at a temperature of 100° C. to 125° C. and a pressure of 0 MPa<P≤0.4 MPa.

16. The synthesis process of claim 2, wherein, in the step 3), the curing and degassing are both carried out at a temperature of 100° C. to 125° C., and the neutralizing is carried out at a temperature of 70° C. to 100° C.

17. The synthesis process of claim 2, wherein a molar ratio of the starting material to the epoxide is 1:(21 to 112).

18. The synthesis process of claim 2, wherein the catalyst accounts for 0.02% to 0.08% of a total amount of feeding materials.

\* \* \* \* \*